(12) United States Patent
Duret et al.

(10) Patent No.: US 10,267,935 B2
(45) Date of Patent: Apr. 23, 2019

(54) INDUCED SEISMIC SOURCE METHOD AND DEVICE

(71) Applicant: CGG SERVICES SA, Massy (FR)

(72) Inventors: Florian Duret, Montigny-le-Bretonneux (FR); Julien Cotton, Paris (FR)

(73) Assignee: CGG SERVICES SAS, Massy (FR)

( * ) Notice: Subject to any disclaimer, the term of this patent is extended or adjusted under 35 U.S.C. 154(b) by 332 days.

(21) Appl. No.: 14/912,247

(22) PCT Filed: Sep. 8, 2014

(86) PCT No.: PCT/EP2014/069094
§ 371 (c)(1),
(2) Date: Feb. 16, 2016

(87) PCT Pub. No.: WO2015/036366
PCT Pub. Date: Mar. 19, 2015

(65) Prior Publication Data
US 2016/0202372 A1  Jul. 14, 2016

Related U.S. Application Data

(60) Provisional application No. 61/876,782, filed on Sep. 12, 2013.

(51) Int. Cl.
*G01V 1/28* (2006.01)
*G01V 1/36* (2006.01)

(52) U.S. Cl.
CPC .............. *G01V 1/288* (2013.01); *G01V 1/366* (2013.01); *G01V 2210/123* (2013.01); *G01V 2210/125* (2013.01); *G01V 2210/679* (2013.01)

(58) Field of Classification Search
CPC .. G01V 1/288; G01V 1/366; G01V 2210/123; G01V 2210/679; G01V 2210/125
(Continued)

(56) References Cited

U.S. PATENT DOCUMENTS 4,691,306 A  9/1987 Arens et al.
6,747,915 B2  6/2004 Calvert
(Continued)

FOREIGN PATENT DOCUMENTS

EP  2169431 A2  3/2010
WO  2012114033 A1  8/2012
(Continued)

OTHER PUBLICATIONS

International Search Report in related International Application No. PCT/EP2014/069094, dated Feb. 26, 2015.
(Continued)

*Primary Examiner* — Fernando L Toledo
*Assistant Examiner* — Adam S Bowen
(74) *Attorney, Agent, or Firm* — Patent Portfolio Builders PLLC (57) ABSTRACT

Method and device for generating an induced source shot point gather. The method includes receiving seismic data at least partially generated by an unintentional seismic source; calculating plural reconstructed receiver traces ($RG_i$) based on pairing traces from the seismic data; and generating the induced source shot point gather based on the plural reconstructed receiver traces ($RG_i$).

20 Claims, 8 Drawing Sheets

(58) Field of Classification Search
USPC .......................................................... 702/16
See application file for complete search history.

(56) References Cited

U.S. PATENT DOCUMENTS

| | | | |
|---|---|---|---|
| 7,447,115 | B2 | 11/2008 | Ferber et al. |
| 7,596,055 | B2 | 9/2009 | Ferber et al. |
| 7,859,942 | B2 | 12/2010 | Stork |
| 8,275,551 | B2 | 9/2012 | Bakulin et al. |
| 8,358,562 | B2 | 1/2013 | Stork |
| 8,395,967 | B2 | 3/2013 | Lou et al. |
| 8,417,458 | B2 | 4/2013 | Halliday et al. |
| 8,463,547 | B2 | 6/2013 | Bakulin et al. |
| 2007/0104028 | A1 | 5/2007 | Van Manen et al. |
| 2008/0080308 | A1 | 4/2008 | Hornby |
| 2010/0067328 | A1 | 3/2010 | Curtis |
| 2010/0074051 | A1 | 3/2010 | Halliday et al. |
| 2010/0286922 | A1 | 11/2010 | Poletto |
| 2010/0315902 | A1 | 12/2010 | Liang et al. |
| 2011/0046885 | A1 | 2/2011 | Bussat et al. |
| 2012/0026835 | A1 | 2/2012 | Shin |
| 2012/0051179 | A1 | 3/2012 | Shin |
| 2012/0081999 | A1 | 4/2012 | Halliday et al. |
| 2013/0003499 | A1* | 1/2013 | Al-Shuhail ............ G01V 1/366 367/50 |
| 2013/0131988 | A1 | 5/2013 | Vermeer et al. |
| 2013/0322211 | A1 | 12/2013 | Gerea et al. |

FOREIGN PATENT DOCUMENTS

| | | |
|---|---|---|
| WO | 2012137117 A2 | 10/2012 |
| WO | 2013076572 A2 | 5/2013 |

OTHER PUBLICATIONS

Written Opinion of the International Searching Authority in related International Application No. PCT/EP2014/069094, dated Feb. 26, 2015.

Bakulin et al., "The Virtual Source Method: Theory and Case Study", GEOPHYSICS, Jul.-Aug. 2006, pp. SI139-SI150, vol. 71, No. 4.

Bakulin et al., "Virtual Source: New Method for Imaging and 4D Below Complex Overburden", SEG International Exposition and 74th Annual Meeting, Oct. 10-15, 2004, Denver, Colorado.

A. Curtis et al., "Seismic Interferometry—Turning Noise into Signal", The Leading Edge, Sep. 2006, vol. 25, No. 9, pp. 1082-1092.

Mehta et al., "Acquisition Geometry Requirements for Generation Virtual-Source Data", The Leading Edge, May 2008, pp. 620-629, vol. 27, No. 5.

Mehta et al., "Strengthening the Virtual-Source Method for Time-Lapse Monitoring", GEOPHYSICS, May-Jun. 2008, pp. S73-S80, vol. 73, No. 3.

* cited by examiner

INDUCED SEISMIC SOURCE METHOD AND DEVICE

CROSS-REFERENCE TO RELATED APPLICATION

The present application is related to, and claims priority from U.S. Provisional Patent Application No. 61/876,782, filed Sep. 12, 2013, entitled "Induced Seismic Source Method," by F. Duret and J. Cotton, the entire content of which is incorporated herein by reference.

TECHNICAL FIELD

Embodiments of the subject matter disclosed herein generally relate to methods and systems for seismic data processing and, more particularly, to mechanisms and techniques for reconstructing induced seismic sources.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves, the collection of reflected/refracted versions of those acoustic waves, and processing the collected seismic data to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Figure 1:
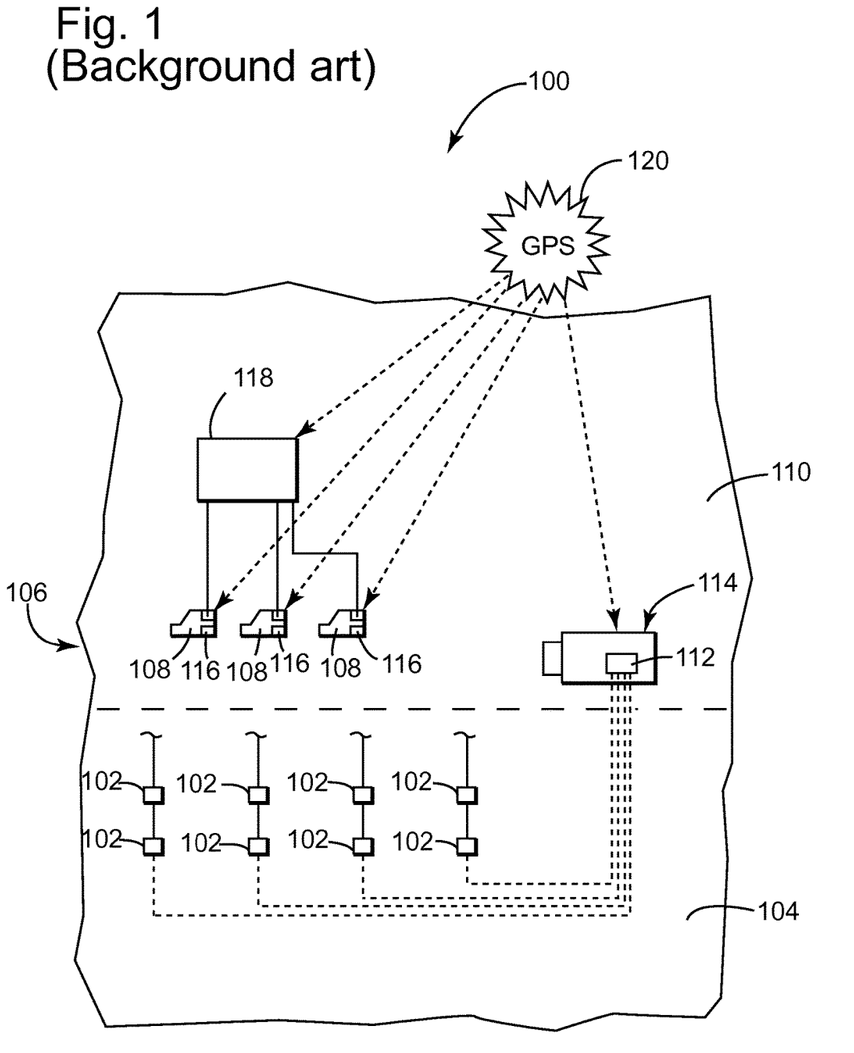
FIG. 1 illustrates a conventional land seismic data acquisition system.

A configuration for achieving land seismic data is illustrated in FIG. 1. FIG. 1 shows a system 100 that includes plural receivers 102 positioned over an area 104 of a subsurface to be explored and in contact with, or below the surface 106 of, the ground. A number of dedicated seismic sources 108 are also placed on the surface 106 in an area 110, in a vicinity of the area 104 of the receivers 102. Note that a dedicated seismic source is defined as a device built by man with the main purpose of generating seismic waves to be used for a seismic survey. Alternatively, dedicated seismic sources 108 may be buried under surface 106. A central recording device 112 is connected to the plurality of receivers 102 and placed, for example, in a station/truck 114. Each dedicated seismic source 108 can be composed of a variable number of vibrators, typically between one and five, and can include a local controller 116. A central controller 118 can be provided to coordinate the shooting times of sources 108. A global positioning system (GPS) 120 can be used to time-correlate shooting of the dedicated seismic sources 108 and the recordings of the receivers 102.

With this configuration, dedicated seismic sources 108 are controlled to intentionally generate seismic waves, and the plurality of receivers 102 records waves reflected by oil and/or gas reservoirs and other structures.

Figure 2:
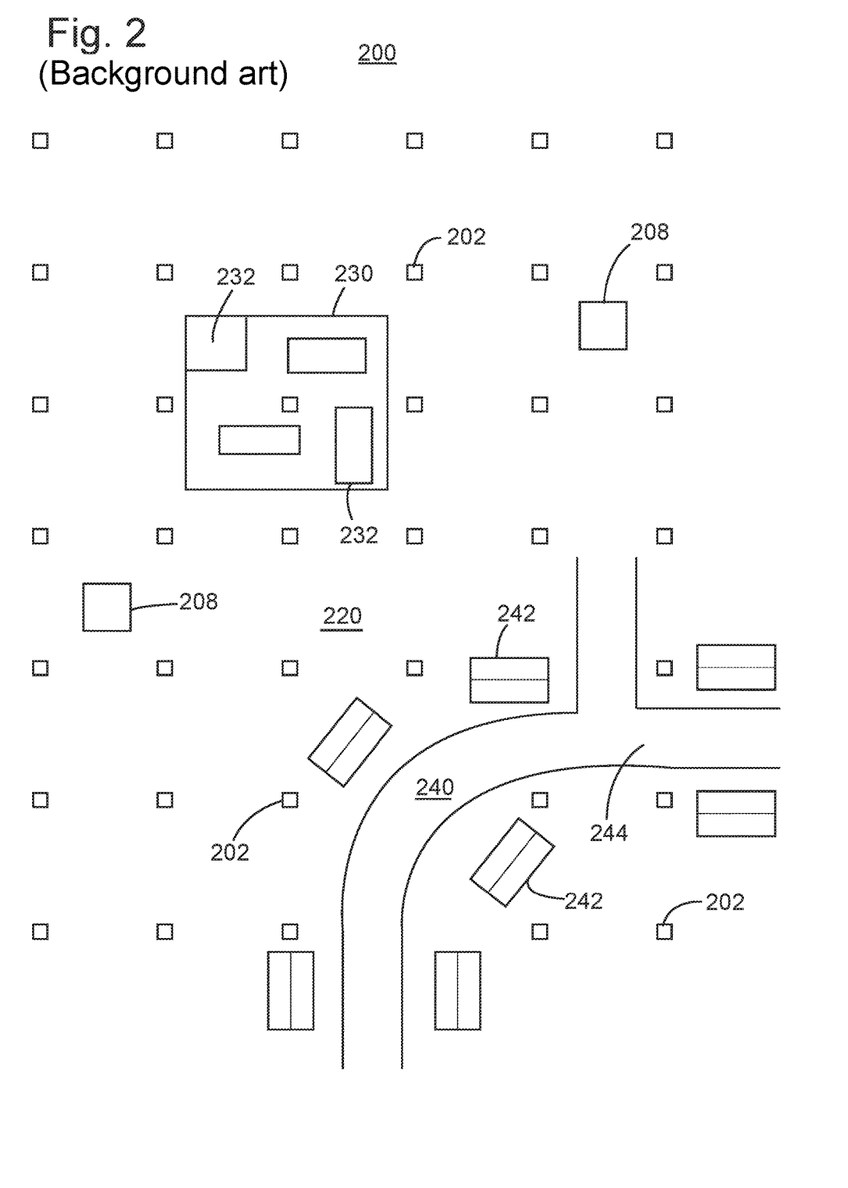
FIG. 2 illustrates an area to be surveyed that includes obstacles which prevent a dedicated seismic source to reach desired shot locations.

However, a typical problem encountered with this kind of seismic acquisition system is the presence of obstacles above the subsurface of interest. More specifically, as illustrated in FIG. 2, acquisition system 200 includes plural seismic receivers 202 distributed above the subsurface 220 of interest. One or more dedicated sources 208 may travel above the subsurface 220 or they may be buried at permanent location to generate seismic waves. However, various obstacles 230 and 240 may be present above subsurface 220 and they may prevent dedicated seismic sources 208 to shoot from those locations. As is known in the art, the dedicated seismic sources follow a pre-plotted track and shoot seismic waves at locations typically corresponding to a grid. The presence of obstacles 230 and 240 disturb the grid and limit available shot locations, which results in poor recorded seismic data for some portions of the subsurface.

Obstacle 230 is illustrated in FIG. 2 as a factory having various buildings 232, while obstacle 240 is illustrated to be a residential area having houses 242 and streets 244. While seismic receivers may be distributed within these obstacles, it is very unlikely that the dedicated seismic sources would be allowed to enter them. This is not only because the owners of the obstacles will not want dedicated seismic sources (typically big trucks with an oscillating plate that generates seismic waves) to disturb their properties, but also because state and county regulations usually prevent such activity in residential and industrial areas.

While the obstacles shown in FIG. 2 are man-made, it is also possible to have naturally occurring obstacles, such as hills, mountains, canyons, abysses, ravines, etc., in which it is not possible to deploy dedicated seismic sources.

Thus, there is a need to obtain seismic data for locations inaccessible to dedicated seismic sources to acquire a better image of the surveyed subsurface.

SUMMARY

According to an embodiment, there is a method for generating an induced source shot point gather. The method includes receiving seismic data at least partially generated by an unintentional seismic source; calculating plural reconstructed receiver traces based on pairing traces from the seismic data; and generating the induced source shot point gather based on the plural reconstructed receiver traces.

According to another embodiment, there is a computing device for generating an induced source shot point gather. The computing device includes an interface configured to receive seismic data at least partially generated by an unintentional seismic source; and a processor connected to the interface. The processor is configured to calculate plural reconstructed receiver traces based on pairing traces from the seismic data, and generate the induced source shot point gather based on the plural reconstructed receiver traces.

According to still another embodiment, there is a computer readable medium that includes software instructions for implementing the method noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for generating an induced source shot point gather that includes a step of receiving seismic data at least partially generated by an unintentional seismic source; a step of calculating plural reconstructed receiver traces (RGi) based on pairing traces from the seismic data; and a step of generating the induced source shot point gather based on the plural reconstructed receiver traces (RGi).

Before discussing more details of the method noted above, a couple of observations and comments are believed to be in order. The method may use local and/or regional activity for reconstructing the induced seismic source. Local activity is generally considered to include activity (man-originated or not) within the area of seismic survey, for example, specific to the area in which the dedicated seismic sources cannot enter or do not have access. Regional activity is generally considered to include activity (man-originated or not) that may not be associated with the specific area in which the dedicated seismic source cannot enter or does not have access.

Figure 3:
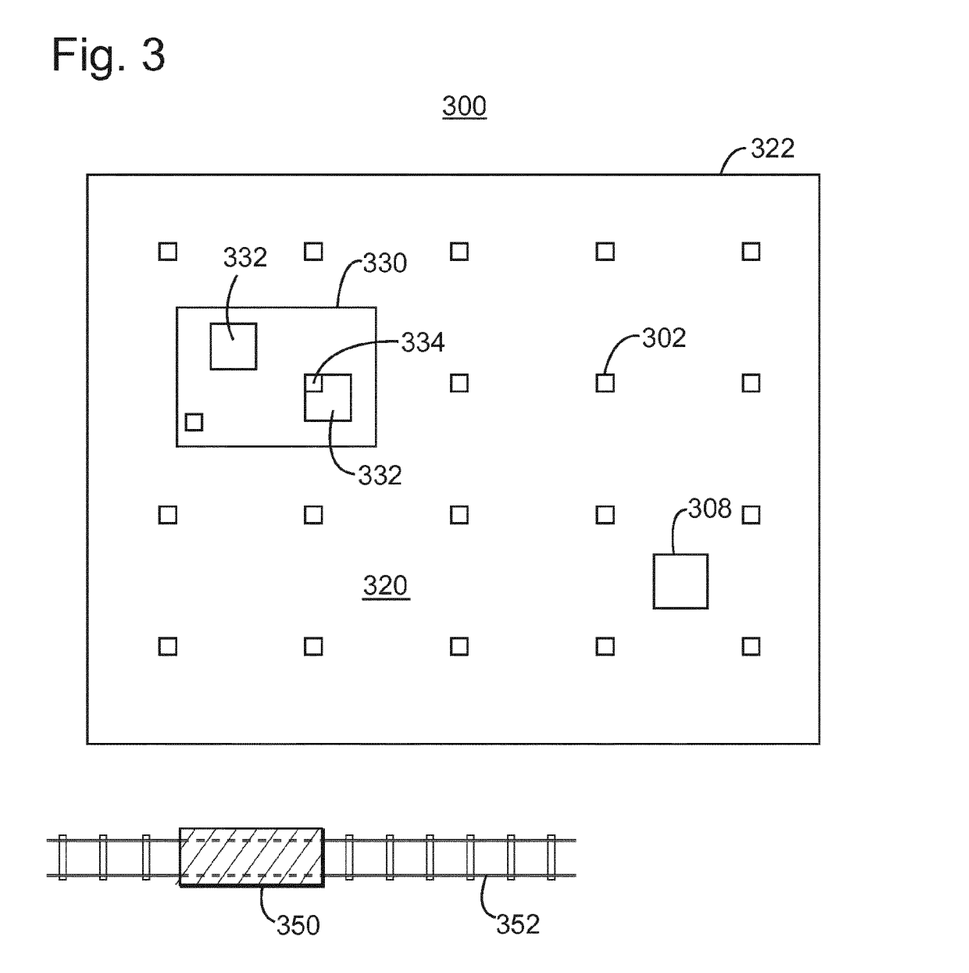
FIG. 3 illustrates a seismic survey system that has local and regional unintentional seismic sources.

For example, with regard to FIG. 3, factory 330 happens to be inside seismic survey system 300, which is deployed over surface 322, which corresponds to subsurface 320. Dedicated seismic source 308 is prevented from shooting inside factory 330. However, seismic receivers 302 may be deployed inside the facility. Suppose that a machine 334 inside one of buildings 332 (note that the machine may be located outside any building) has some moving parts which generate seismic waves of interest for the seismic survey. This machine has a main purpose of performing another function, specific to the profile of factory 330, and the generated seismic waves are an unintentional byproduct of the machine. Such a machine is called herein an "unintentional seismic source," to highlight that the machine's purpose is not to generate seismic waves. The byproduct of an unintentional seismic source is the generation of seismic waves. An unintentional seismic source is the opposite of a dedicated seismic source, whose main scope is to generate seismic waves for a seismic survey system.

Another example of an unintentional seismic source is a train 350 that follows tracks 352. Note that train 350 is located outside surface 322, which corresponds to subsurface 320. Due to its weight and movement, train 350 may unintentionally generate seismic waves, which may be of use to the seismic system 300 as discussed later. Thus, train 350 constitutes an unintentional seismic source. Other examples of unintentional seismic sources may be associated with human activity, e.g., a truck, a pick-hammer, a tractor-trailer, road traffic, any machine in a factory, etc., or with naturally occurring phenomena, e.g., a waterfall, a river, waves in the ocean, rain, wind, earthquake, etc.

Unintentional seismic source 334 is associated with local activity, i.e., activity taking place within the boundaries of surface 322, while unintentional seismic source 350 is associated with regional activity, i.e., activity taking place outside the boundaries of surface 322.

The unintentional seismic source may be active for a short period of time, for long periods, or it may be on and off with or without any given time interval. The unintentional seismic source may be used by itself, in combination with other unintentional seismic sources, and/or in combination with one or more dedicated seismic sources. Thus, use of the unintentional seismic source may increase the frequency content of the seismic survey by complementing the dedicated seismic sources, or it may replace them. Seismic receiver 302 may include hydrophones, geophones, accelerometers, optical sensors, or any combination of these or other sensors.

Traditional seismic interferometry methods require equipartition of the dedicated seismic sources (i.e., having shooting points distributed on a uniform grid) on or around the seismic survey surface 322 to ensure that the reconstructed wavefield is that of a plane wave arriving at the receivers array from below. However, according to the method to be discussed next, the local and/or regional sources need not be homogenously distributed over the area. According to this method, each available source is reconstructed to obtain shot points that would be processed using regular techniques to obtain information about surveyed area 322.

Figure 4:
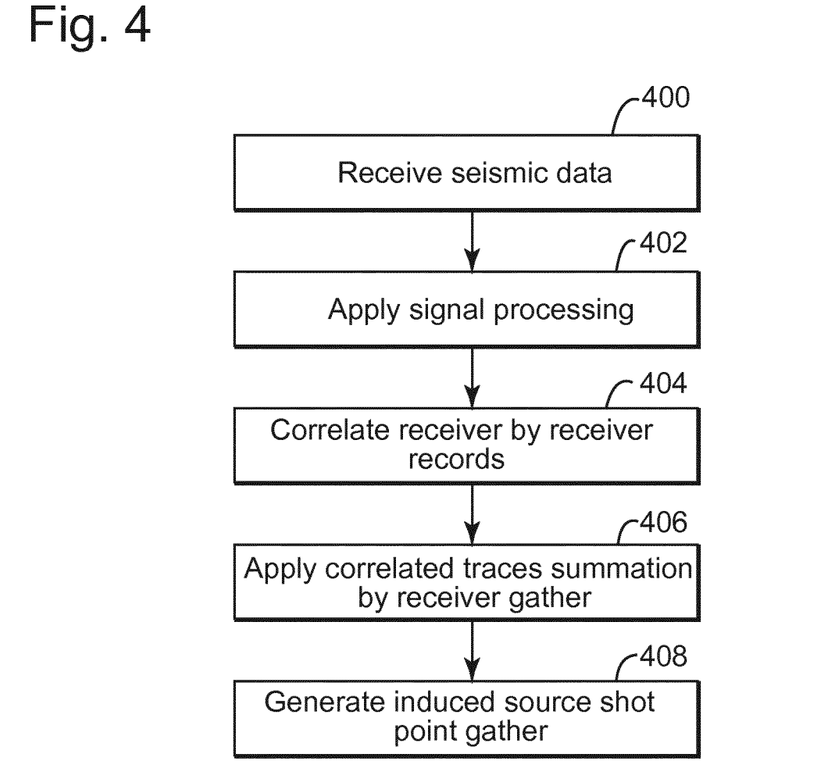
FIG. 4 is a flowchart of a method for generating an induced source shot point gather.

Thus, according to an embodiment illustrated in FIG. 4, a method for reconstructing an induced source shot point includes a step 400 of recording (or receiving) seismic data. The seismic data is recorded with seismic receivers 302 over an area of interest 322, as illustrated in FIG. 3. Any type of seismic receivers may be used. The recorded seismic data may include that generated by dedicated seismic sources and/or unintentional seismic sources. In one application, the seismic survey uses dedicated seismic sources 308 for collecting a first set of seismic data. Later in time, the local and/or regional activities (i.e., unintentional seismic sources) may be used to record a second set of seismic data. The two sets may be merged to form the recorded seismic data. The two sets may be recorded simultaneously or with a time lag. In one application, it is possible to record the second set years after the first set has been recorded. In other words, the two sets of data may be collected at any time. Note that the method also works only with the second set of data, i.e., even when the first set of data is unavailable.

In step 402, the recorded seismic data is processed based on traditional pre-processing methods, e.g., demultiple, signature deconvolution, trace summing, vibroseis correlation, resampling, etc. After the traces recorded at each seismic receiver are processed as discussed above, the method advances to step 404 in which these traces are correlated to each other. In other words, a trace recorded by one seismic receiver is correlated, one by one, with traces recorded by other seismic receivers to ensure that common events are present on two or more traces. The term "common events" includes an event generated by the unintentional seismic source and/or by dedicated seismic source and recorded by two or more seismic receivers. Note that in one application, each trace of each seismic receiver is correlated with all other traces of the seismic receivers. However, in another application, the traces that are correlated may be restricted to a group of seismic receivers selected to be in a same neighborhood.

Figure 5A:
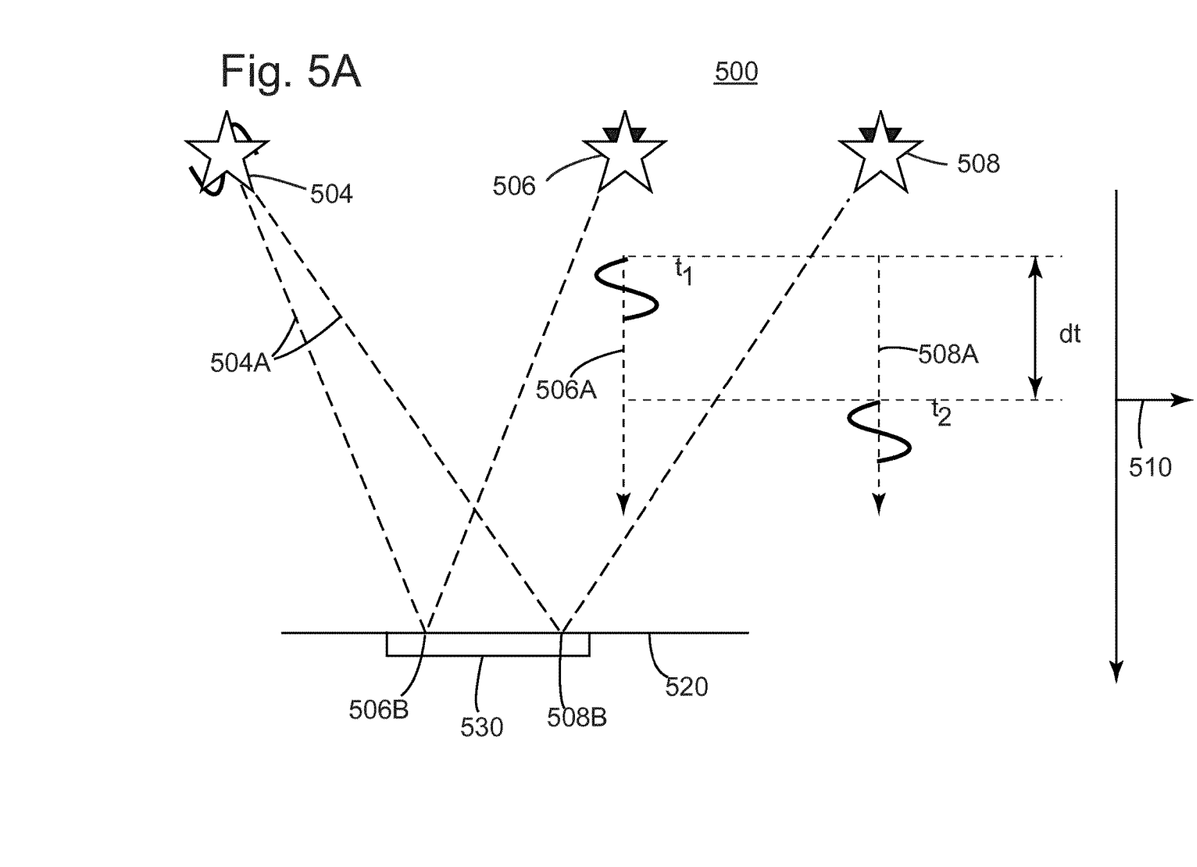
FIG. 5A schematically illustrates a pair of receivers that are treated as a source and a receiver.
Figure 5B:
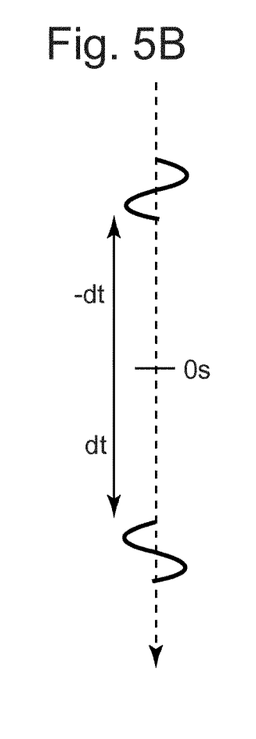
FIG. 5B schematically illustrates a time lag between recordings of the pair of receivers.

FIG. 5A shows an unintentional seismic source 504 and two seismic receivers 506 and 508 recording corresponding traces 506A and 508A. A result 510 of correlating traces 506A and 508A is non-zero, which indicates that the two traces include common events, i.e., a reflection and/or refraction of seismic waves 504A, generated by unintentional seismic source 504, on a same geological feature 520. According to an embodiment, because there is no information about the unintentional seismic source, e.g., its source signature, it is possible to consider that one of receivers 506 and 508 acts as a source and the other receiver records the seismic data. In this regard, the reader may consult one or more of the following articles describing this concept: A. Bakulin and R. Calvert in "The virtual source method: Theory and case study," Geophysics, Vol. 71, No. 4, p. SI139, Mehta et. al., in "Strengthening the virtual-source method for time-lapse monitoring," Geophysics, Vol. 73, No. 3, p. S73, and A. Bakulin and R. Calvert in "Virtual Source: new method for imaging and 4D below complex overburden," SEG Int'l Exposition and 74$^{th}$ Annual Meeting, October 2004, the entire contents of which are incorporated herein by reference. With this assumption, a positive lag +dt as indicated in FIG. 5B suggests that receiver 506 acts as a source while a negative lag −dt indicates that receiver 508 acts as a source.

Figure 6:
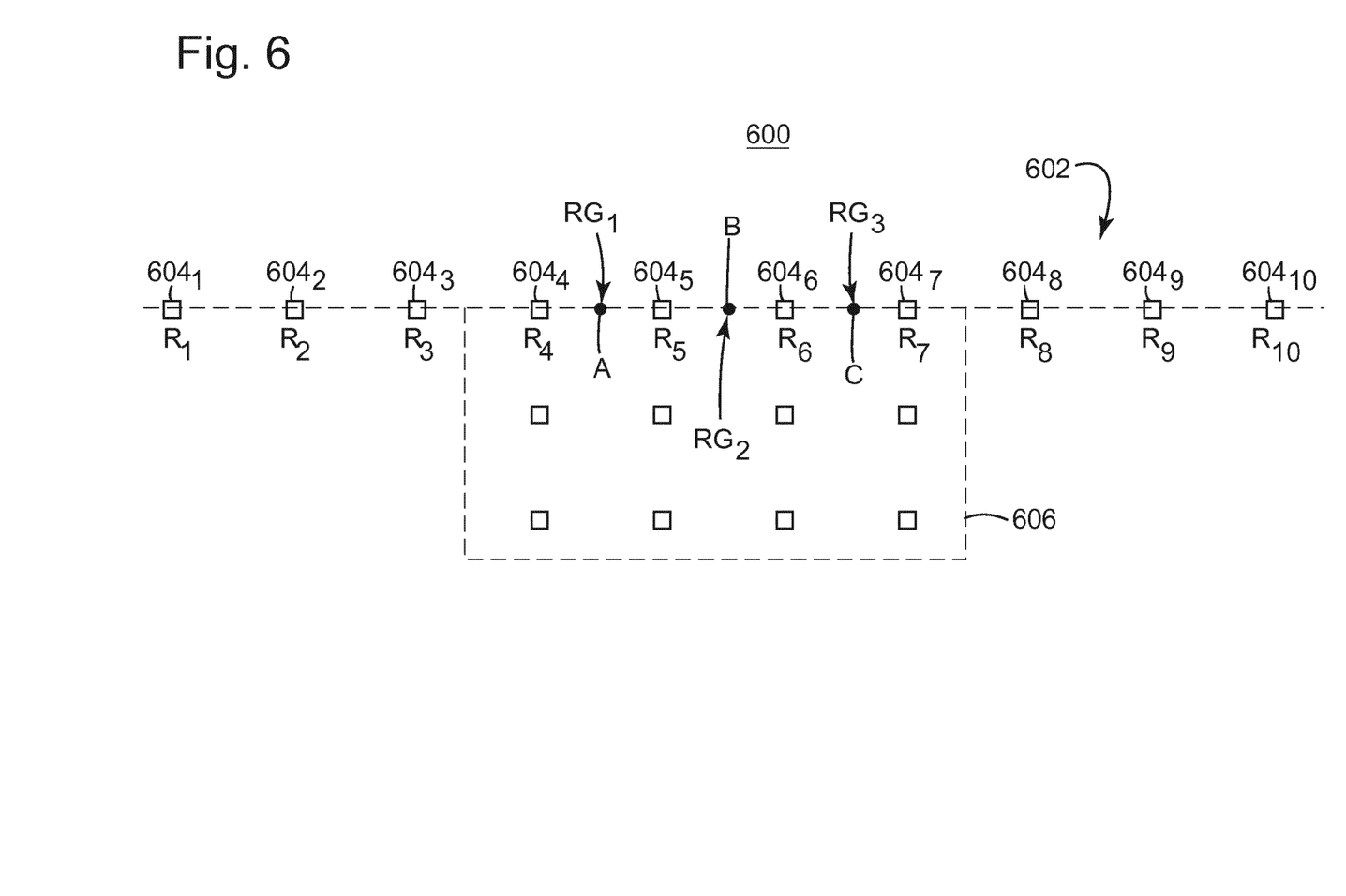
FIG. 6 schematically illustrates a group of receivers used to calculate a reconstructed receiver trace.

Once the recorded traces have been verified in step 404 to include common events, the method advances to step 406 for calculating one or more reconstructed receiver traces. A reconstructed receiver trace $RG_i$ is calculated based on the idea that one actual receiver of a pair of receivers is considered to act as a source and another actual receiver of the pair of receivers is considered to act as the receiver. More specifically, suppose that a group 602 of seismic receivers $604_1$ to $604_{10}$ (or $R_1$ to $R_{10}$ for simplicity) are distributed along a line L as illustrated in FIG. 6. FIG. 6 shows an array 600 of seismic receivers. Those skilled in the art would appreciate that more or fewer seismic receivers may belong to group 602, and they may also be distributed based on a different geometry, e.g., a rectangle 606 having a predetermined size. A first reconstructed receiver trace $RG_1$ may be calculated as follows:

$$RG_1 = R_1 \otimes R_8 + R_2 \otimes R_7 + R_3 \otimes R_6 + R_4 \otimes R_5 \quad (1)$$

where operator "$\otimes$" stands for a mathematical operator used to reconstruct the wave field, and $R_i$ is the trace associated with seismic receiver "i." The operator may be correlation, convolution, deconvolution or any combination of operations capable of reconstructing different wave fields. The number of seismic receivers included in equation (1) can vary. Note that the farthest apart seismic receivers $R_1$ and $R_8$ considered for calculating reconstructed receiver trace $RG_1$ are symmetric relative to the position A of $RG_1$. The same is true for pairs $R_2$ and $R_7$, $R_3$ and $R_6$ and $R_4$ and $R_5$. The results of each cross-correlation operation in equation (1) are summed together to form the first reconstructed receiver trace $RG_1$. It is possible to sum together the pairs noted above because they substantially describe (or carry seismic information about) the same geo-seismic feature 520, as illustrated in FIG. 5A. FIG. 5A shows a bin 530 that includes reflection points 506B and 508B belonging to traces 506A and 508A, respectively. Because reflection points 506B and 508B belong to the same bin 530, it is considered that these reflection points describe the same point of the subsurface. Further, it is possible to sum the pairs noted above based on the assumption that one member of the pair is the source and the other member of the pair is the actual receiver as discussed above.

Returning to FIG. 6, second and third reconstructed receiver traces $RG_2$ and $RG_3$ are calculated as follows:

$$RG_2 = R_1 \otimes R_{10} + R_2 \otimes R_9 + R_3 \otimes R_8 + R_4 \otimes R_7 + R_5 \otimes R_6 \quad (2)$$

and $$RG_3 = R_3 \otimes R_{10} + R_4 \otimes R_9 + R_5 \otimes R_8 + R_6 \otimes R_7. \quad (3)$$

Any number of reconstructed receiver traces may be calculated, and each reconstructed receiver trace may include any number of pairs. However, there are practical limitations (computer calculation power, amount of time available for doing the calculations, the cost, etc.) that may limit the amount of reconstructed receiver traces and/or number of pairs included in one reconstructed receiver trace. Also, with reference to FIG. 5A, note that if a distance between seismic receivers 506 or 508 becomes comparable with a depth of seismic feature 520 (which is normally not the case), reflection points 506B and 508B might not belong to a same bin, and thus, the reconstructed receiver trace may not include the pair of receivers 506 and 508.

To summarize this step, the method selects a first physical location A within area 322 associated with the seismic survey, selects a first group 602 of receivers $R_1$ to $R_{10}$ that are substantially symmetrically located relative to the first physical location A, and then calculates a first reconstructed receiver trace $RG_1$ corresponding to first physical location A. The method then continues by selecting a second physical location B within area 322 associated with the seismic survey, selects a second group of receivers R1 to R8 that are substantially symmetrically located relative to the second physical location B, and then calculates the second reconstructed receiver trace $RG_2$ corresponding to second physical location B.

The method may further continue to calculate other reconstructed receiver traces as decided by the seismic survey's operator. For each reconstructed receiver trace, the method applies a mathematical operator to pairs of traces corresponding to each group of receivers and sums the results of this step to form respective reconstructed receiver traces. In one application, it is desired to include as many pairs as possible in the calculation of a reconstructed receiver trace.

The method discussed herein can be applied to any number of receivers, any type of receivers, to 2-dimensional (2D), 3D or 4D seismic surveys, monitoring operations, etc.

After the correlated traces summation has been applied in step 406 to calculate reconstructed receiver traces $RG_i$, the induced source shot point gather is generated in step 408, and it includes the collection of reconstructed receiver traces $RG_i$.

Figure 7:
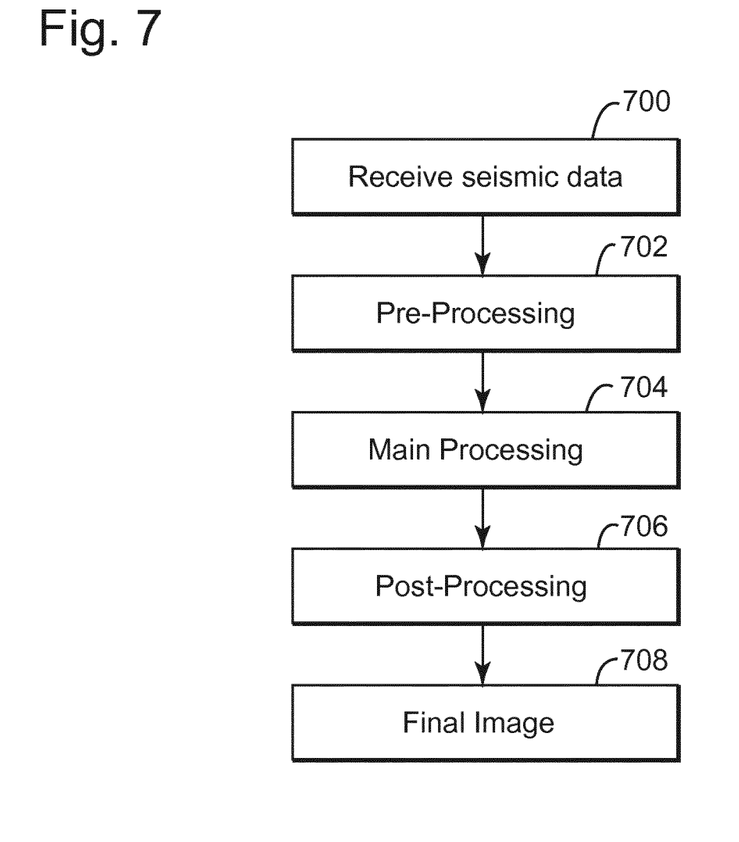
FIG. 7 is a flowchart of a method for processing seismic data to generate an image of the surveyed subsurface.

Having the induced source shot point gather generated in step 408, this data may now be processed as illustrated in FIG. 7 to obtain a final image of the subsurface of interest. In step 700, the original seismic data (from step 400) is received. Then, as also discussed above, pre-processing methods are applied in step 702, which corresponds to step 402. Then, a main processing step 704 is applied, which includes the induced source shot point gather generated in step 408. The main processing step 704 may also include, for example, deconvolution, amplitude analysis, statics determination, common middle point gathering, velocity analysis, normal move-out correction, muting, trace equalization, stacking, noise rejection, amplitude equalization, etc. In step 706, final or post-processing methods are applied, e.g. migration, wavelet processing, inversion, etc. In step 708 the final image of the subsurface is generated.

A possible application of this method is to provide infills for areas with restricted access to sources and/or receivers for either 3D or 4D seismic surveys. The method described above also may extend the survey frequency content toward lower frequencies (typically less than 2 Hz) because unintentional seismic sources typically emit seismic waves in this frequency range.

Another application is related to undertaking hydraulic fracturing in a reservoir. For this situation, it is desirable to detect and locate the hypocenters of micro-seismic sources induced by the fracturing. To do so, it is necessary to estimate a velocity model of propagating medium using a known event. This known event can be a dedicated source (e.g., string-shot), or an indirect source (e.g., perforation shot). Thus, according to an embodiment, there is a method to determine a velocity model of the medium when neither of these sources is available using the induced seismic source. As discussed above, using seismic interferometry, it is possible to turn each receiver located at the surface and recording (preferentially) in a continuous fashion the ambient seismic noise into a source. In doing so, the travel time (and possibly the amplitude) of the impulse response between pairs of receivers can be retrieved and used to invert for the propagation velocity that best matches the measured, synthesized travel times. This method can particularly focus on two different aspects of the velocity model: (1) the sub-surface velocity model, in order to determine static fields for surface sensors, and (2) full propagation velocity field between microseismic sources and sensors. In both cases, few noise sources may be exploited: downhole noise (sand jetting, injection itself, etc.); surface facilities (pumps, etc.); swell, wind, etc.; and drilling noise. It is also desirable to include induced seismic events—i.e., micro-seismic events—to estimate the spatial velocity variations within the focal volume, by turning each source into a virtual receiver. Irrespective of the type of survey or the type of source used to generate the seismic waves, surface, reflected and refracted waves are generated. The methods discussed above may use only one type of these waves or a combination of two or more to determine the induced source shot point gather.

Figure 8:
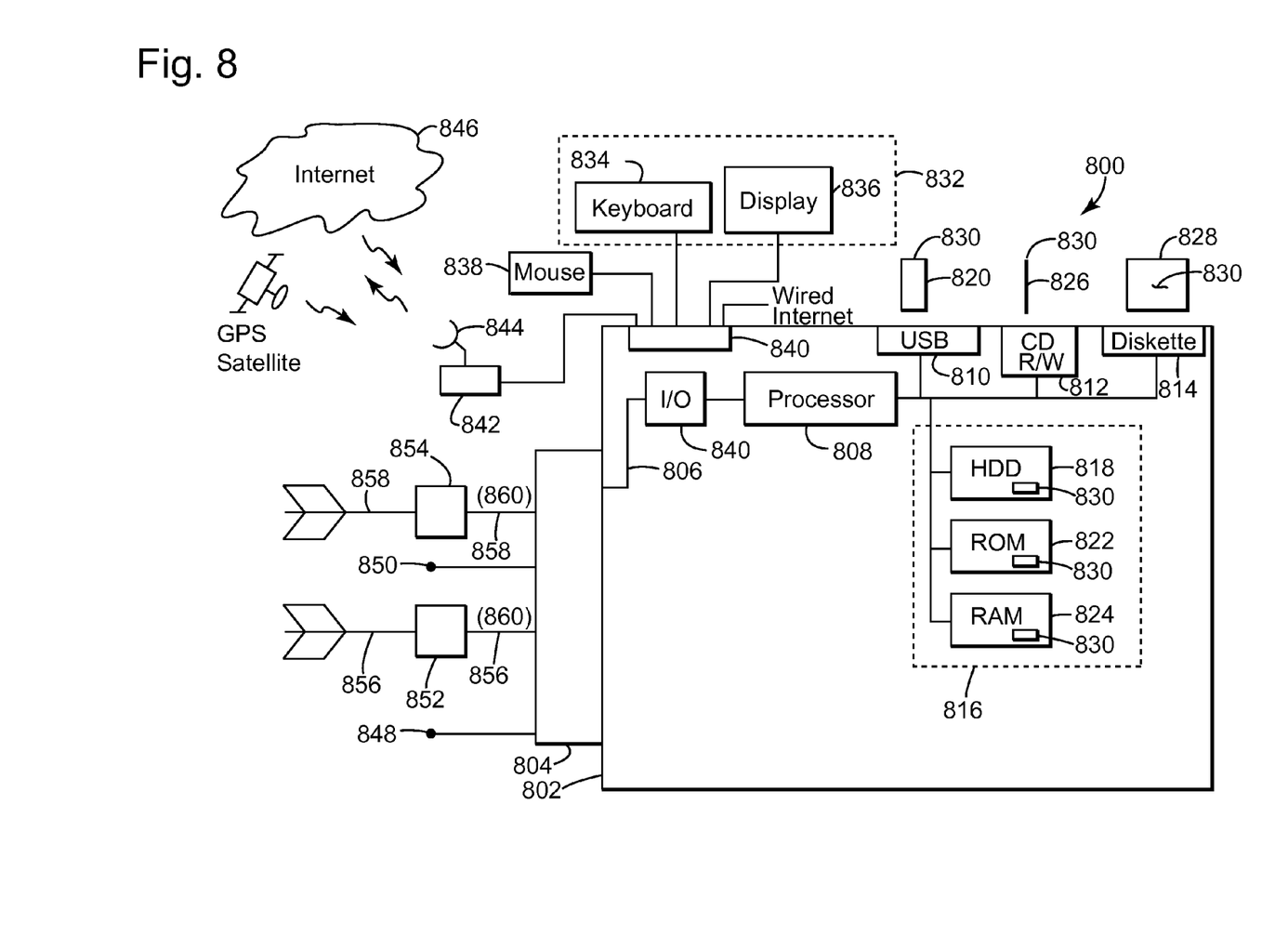
FIG. 8 illustrates an exemplary data processing device or system which can be used to implement the methods.

A computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 8. System 800 includes, among other items, server 802, source/receiver interface 804, internal data/communications bus (bus) 806, processor(s) 808, universal serial bus (USB) port 810, compact disk (CD)/ digital video disk (DVD) read/write (R/W) drive 812, floppy diskette drive 814 (though less used currently, many servers still include this device), and data storage unit 816.

Data storage unit 816 itself can comprise hard disk drive (HDD) 818 (these can include conventional magnetic storage media, but, as is becoming increasingly more prevalent, can include flash drive-type mass storage devices 820, among other types), ROM device(s) 822 and random access memory (RAM) devices 824. Usable with USB port 810 is flash drive device 820, and usable with CD/DVD R/W device 812 are CD/DVD disks 826 (which can be both read and write-able). Usable with diskette drive device 814 are floppy diskettes 828. Each of the memory storage devices, or the memory storage media (818, 820, 822, 824, 826, and 828, among other types), can contain parts or components, or in its entirety, executable software programming code (software) 830 that can implement part or all of the portions of the method described herein. Further, processor 808 itself can contain one or different types of memory storage devices (most probably, but not in a limiting manner, RAM memory storage media 824) that can store all or some of the components of software 830.

In addition to the above-described components, system 800 also includes user console 832, which can include keyboard 834, display 836, and mouse 838. All of these components are known to those of ordinary skill in the art, and this description includes all known and future variants of these types of devices. Display 836 can be any type of known display or presentation screen, such as liquid crystal displays (LCDs), light emitting diode displays (LEDs), plasma displays, cathode ray tubes (CRTs), among others. User console 832 can include one or more user interface mechanisms such as a mouse, keyboard, microphone, touch pad, touch screen, voice-recognition system, among other interactive inter-communicative devices.

User console 832, and its components if separately provided, interface with server 802 via server input/output (I/O) interface 840, which can be an RS232, Ethernet, USB or other type of communications port, or can include all or some of these, and further includes any other type of communications means, presently known or further developed. System 800 can further include communications satellite/global positioning system (GPS) transceiver device 842, to which is electrically connected at least one antenna 844 (according to an embodiment, there would be at least one GPS receiver-only antenna, and at least one separate satellite bi-directional communications antenna). System 800 can access the Internet 846, either through a hard-wired connection, via I/O interface 840 directly, or wirelessly via antenna 844, and transceiver 842.

Server 802 can be coupled to other computing devices, such as those that operate or control the equipment of truck 112 of FIG. 1, via one or more networks. Server 802 may be part of a larger network configuration as in a global area network (GAN) (e.g., Internet 846), which ultimately allows connection to various landlines.

According to a further embodiment, system 800, being designed for use in seismic exploration, will interface with one or more sources 848, 850 and one or more receivers 852, 854. As further previously discussed, sources 848, 850 and receivers 852, 854 can communicate with server 802 either through an electrical cable, or via a wireless system that can communicate via antenna 844 and transceiver 842 (collectively described as communications conduit 860).

According to further exemplary embodiments, user console 832 provides a means for personnel to enter commands and configuration into system 800 (e.g., via a keyboard, buttons, switches, touch screen and/or joy stick). Display device 836 can be used to show: source/receiver 856, 858 position; visual representations of acquired data; source 848, 850 and receiver 852, 854 status information; survey information; and other information important to the seismic data acquisition process. Source and receiver interface unit 804 can receive the seismic data from receiver 852, 854 though communication conduit 860 (discussed above). Source and receiver interface unit 804 can also communicate bi-directionally with sources 848, 850 through the communication conduit 860. Excitation signals, control signals, output signals and status information related to source 848, 850 can be exchanged by communication conduit 860 between system 800 and source 848, 850.

System 800 can be used to implement the methods described above associated with the calculation of the induced source shot gather. Hardware, firmware, software or a combination thereof may be used to perform the various steps and operations described herein. According to an exemplary embodiment, software 830 for carrying out the above-discussed steps can be stored and distributed on multimedia storage devices.

The disclosed exemplary embodiments provide a computing device, software and method for calculating the induced source shot gather. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration of subsurface using an induced source shot point gather, the method comprising:
    receiving seismic data representative for seismic waves emerging from a subsurface formation, the seismic waves being at least partially generated by an unintentional seismic source;
    correlating traces from the seismic data to pair those that share a common event;
    calculating plural reconstructed receiver traces ($RG_i$) based on the paired traces from the seismic data, the plural reconstructed receiver traces being associated with physical locations in-between receivers that recorded the paired traces;
    generating the induced source shot point gather based on the plural reconstructed receiver traces ($RG_i$); and
    generating an image of the subsurface formation based on the induced source shot point gather.

2. The method of claim 1, wherein the step of calculating comprises:
    selecting a first physical location within an area associated with a seismic survey;
    selecting a first group of receivers that are substantially symmetrically located relative to the first physical location; and
    calculating a first reconstructed receiver trace corresponding to the first physical location.

3. The method of claim 2, further comprising:
    applying a mathematical operator to pair of traces corresponding to the first group of receivers; and
    summing results of the applying a mathematical operator step to form the first reconstructed receiver trace.

4. The method of claim 3, wherein the mathematical operator is one of:
    convolution, correlation, deconvolution or a combination of them.

5. The method of claim 2, wherein receivers from the first group of receivers are located along a straight line.

6. The method of claim 2, further comprising:
    selecting a second physical location within the area associated with the seismic survey;
    selecting a second group of receivers that are substantially symmetrically located relative to the second physical location; and
    calculating a second reconstructed receiver trace corresponding to the second physical location.

7. The method of claim 6, wherein the induced source shot point gather includes the first and second reconstructed receiver traces.

8. The method of claim 1, wherein the unintentional seismic source is a regional source.

9. The method of claim 1, wherein an obstacle prevents exploring the subsurface formation using a dedicated seismic source.

10. A computing device for seismic exploration of subsurface using an induced source shot point gather, the computing device comprising:
    an interface configured to receive seismic data representative for seismic waves emerging from a subsurface formation, the seismic waves being at least partially generated by an unintentional seismic source; and
    a processor connected to the interface and configured to,
    correlate traces from the seismic data to pair those that share a common event,
    calculate plural reconstructed receiver traces ($RG_i$) based on the paired traces from the seismic data, the plural reconstructed receiver traces being associated with physical locations in-between receivers that recorded the paired traces,
    generate the induced source shot point gather based on the plural reconstructed receiver traces ($RG_i$), and
    generate an image of the subsurface formation based on the induced source shot point gather.

11. The device of claim 10, wherein the processor is further configured to:
    select a first physical location within an area associated with a seismic survey;
    selecting a first group of receivers that are substantially symmetrically located relative to the first physical location; and calculate a first reconstructed receiver trace corresponding to the first physical location.

12. The device of claim 11, wherein the processor is further configured to:
apply a mathematical operator to pair of traces corresponding to the first group of receivers; and
sum results of the applying a mathematical operator step to form the first reconstructed receiver trace.

13. The device of claim 12, wherein the mathematical operator is one of:
convolution, correlation, deconvolution or a combination of them.

14. The device of claim 11, wherein receivers from the first group of receivers are located along a straight line.

15. The device of claim 11, wherein the processor is further configured to:
select a second physical location within the area associated with the seismic survey;
select a second group of receivers that are substantially symmetrically located relative to the second physical location; and
calculate a second reconstructed receiver trace corresponding to the second physical location.

16. The device of claim 15, wherein the induced source shot point gather includes the first and second reconstructed receiver traces.

17. The device of claim 10, wherein the unintentional seismic source is a regional source.

18. The device of claim 10, wherein an obstacle prevents exploring the subsurface formation using a dedicated seismic source.

19. A non-transitory computer readable medium including computer executable instructions, wherein the instructions, when executed by a computer, implement a method for seismic exploration of subsurface using an induced source shot point gather, the method comprising:
receiving seismic data representative for seismic waves emerging from a subsurface formation, the seismic waves being at least partially generated by an unintentional seismic source;
correlating traces from the seismic data to pair those that share a common event;
calculating plural reconstructed receiver traces ($RG_i$) based on the paired traces from the seismic data, the plural reconstructed receiver traces being associated with physical locations in-between receivers that recorded the paired traces;
generating the induced source shot point gather based on the plural reconstructed receiver traces ($RG_i$); and
generating an image of the subsurface formation based on the induced source shot point gather.

20. The non-transitory computer readable medium of claim 19, wherein an obstacle prevents exploring the subsurface formation using a dedicated seismic source.

* * * * *